(12) United States Patent
Kuratsuji et al.

(10) Patent No.: US 6,982,289 B2
(45) Date of Patent: Jan. 3, 2006

(54) POLYAMIDE BASED ANTIBACTERIAL POWDER PAINT COMPOSITION

(75) Inventors: Takatoshi Kuratsuji, Kyoto (JP); Hiroshi Shimizu, Kyoto (JP)

(73) Assignee: Arkema, Puteaux (FR)

( * ) Notice: Subject to any disclaimer, the term of this patent is extended or adjusted under 35 U.S.C. 154(b) by 10 days.

(21) Appl. No.: 10/296,458

(22) PCT Filed: May 18, 2001

(86) PCT No.: PCT/EP01/07005

§ 371 (c)(1),
(2), (4) Date: Apr. 30, 2003

(87) PCT Pub. No.: WO01/90259

PCT Pub. Date: Nov. 29, 2001

(65) Prior Publication Data

US 2003/0171452 A1    Sep. 11, 2003

(30) Foreign Application Priority Data

May 25, 2000  (JP)  .............................. 2000-154685

(51) Int. Cl.
  *B32B 27/34*   (2006.01)
  *C08K 3/08*    (2006.01)
(52) U.S. Cl. ..................... 523/122; 523/216; 524/439; 524/904; 428/407; 428/474.4
(58) Field of Classification Search ................ 524/403, 524/434, 439, 904; 523/122, 216; 428/474.4, 428/407
See application file for complete search history.

(56) References Cited

U.S. PATENT DOCUMENTS

| | | | |
|---|---|---|---|
| 4,911,898 A * | 3/1990 | Hagiwara et al. | ........... 423/700 |
| 4,938,958 A | 7/1990 | Niira et al. | |
| 5,503,840 A | 4/1996 | Jacobson et al. | |
| 6,342,551 B1 * | 1/2002 | Jolley et al. | ................ 524/210 |
| 6,491,984 B2 | 12/2002 | Rigosi et al. | |

FOREIGN PATENT DOCUMENTS

| | | |
|---|---|---|
| EP | 0270129 | 6/1988 |
| JP | 09067514 A * | 3/1997 |
| WO | WO 8910947 | 11/1989 |

OTHER PUBLICATIONS

Toa Gosei Chem Ind Ltd, "WPI World Patent Information Derwent, Derwent, GB," WPI World Patent Information Derwent, vol. 13, NR. 94 XP002024461, abstract, Derwent, GB.

* cited by examiner

*Primary Examiner*—Tae H. Yoon
(74) *Attorney, Agent, or Firm*—Millen, White, Zelano & Branigan, P.C.

(57) ABSTRACT

Antibacterial powder paint composition consisting mainly of polyamide, characterized in that zinc and/or silver/zinc composite compound is incorporated in polyamide as antibacterial agent. This powder coating composition can produce a film with improved antibacterial activity, discoloration and endurance.

13 Claims, No Drawings

POLYAMIDE BASED ANTIBACTERIAL POWDER PAINT COMPOSITION

FIELD OF TECHNOLOGY

This invention relates to polyamide-type antibacterial powder paint composition.

An objective of this invention is to provide a polyamide-type antibacterial powder paint composition improved in discoloration.

PRIOR ARTS

Surface coating is well-known and has been used since old days to protect-metallic materials from rust and to improve appearance and properties Of various materials. Organic coating materials such as ester type, epoxy type and combination thereof, urethane type, acryl type, polyamide type and fluorine type resins are used widely. These organic coating materials are usually dissolved or dispersed in organic solvent to facilitate handling and processing. Use of organic solvent, however, is not desirable from the view point of contamination in surrounding and in working environment and hence is controlled by law. To solve this problem, water-soluble paints, water-dispersion paints and powder paint are developed as solvent-free paints and are used in practical uses.

Anti-bacterium and anti-mold property are, also required when the paints are used in such applications that coated products are contacted with unspecified number of men and in the field of foods, medical care and sanitation such as shopping carts, handles of bass and trains, kitchenware and bathroom wears. In these applications, it is common practice to add or incorporate antibacterial agent or fungicides in material resins.

A variety of anti-bacterium and fungicides are known. Natural anti-bacterium and fungicides are difficult to handle because they possess relatively low boiling points. Organic anti-bacterium and fungicides have a problem of low heat-stability so that their efficiency is lost during melting stage, although they are compatible with resins. Inorganic anti-bacterium and fungicides possess high heat-stability but have such problems as poor solubility in resins and low durability due to dissolution into water.

Therefore, it is critical to select anti-bacterium and fungicides in accordance with natures of resin to be combined, molding conditions, use condition, applications or the like.

PROBLEMS TO BE SOLVED BY THE INVENTION

Inorganic antibacterial agent, in particular silver type antibacterial agent has a problem of discoloration when the agent is used with polyamide type powder paint and hence its application is restricted.

An object of this invention is to provide such antibacterial composition that shows little problem of discoloration in polyamide type powder paint.

Inventors found that the objective can be realized by incorporating a special antibacterial agent in the resin.

Means to Solve the Problems

This invention provides antibacterial powder paint composition consisting mainly of polyamide, characterized in that zinc and/or silver/zinc composite compound is incorporated in polyamide as an antibacterial agent.

Embodiment

"Polyamide" in this invention is understood as polyamide which is a polymer of amino carboxylic acid having a carbon number of 6 or more or of lactam or a polymer of diamine having a carbon number of 6 or more and salt of dicarboxylic acid, for example, aminocarboxylic acid such as ω-aminocaproic acid, ω-amino enanthic acid, ω-amino caplyric acid, ω-amino pelargonic acid, ω-amino capric acid, ω-amino undecanoic acid, and ω-amino dodecanoic acid; lactam such as caprolactam, enantlactam, caprillactam and laurolactam; salts such as hexamethylenediamine-adipate, hexamethylenediamine-sebacate, hexamethylenediamine-isophthalate, undeca methylenediamine-adipate and 4,4'-diaminodichlorohexylmethane-dodecanoate. Polyamide can be homopolymer or copolymer and can be blended with other resins. Polyamide can also contain catalyst and various stabilizers. Preferably, polyamide 11 and polyamide 12 are used.

"Powder paint" used in this invention is understood as a product prepared by mixing a variety of additives such as pigment, dye, heat-stabilizer, light-stabilizer, lubricant, plasticizer, antistatic agent, crystal nucleus forming agent and fire retardant with the "polyamide" resin in powder forms or by melt-mixing them followed by pulverization. The paint is applicable to any coating technique including fluidized bed coating, electrostatic coating and melt-spray coating.

"Antibacterial agent" used in this invention can be mentioned as natural products (for example, hinokitiol, chitin, chitosan), organic compounds (for example, imidazole, thiazole, nitrile, haloalkylthio, pyridine, triazine, brom type, quaternary ammonium type) and inorganic compounds (for example zeolite, zirconium phosphate, calcium phosphate, titania type, silicon oxide, inorganic ion exchanger).

In this invention, the antibacterial agent must be zinc and/or silver/zinc complex compound. These metals may be supported on zeolite, inorganic ion exchanger or inorganic glass compound for example.

The composition containing Zn and/or Ag/Zn compound according to the present invention can have any form such as a composition on which all components are mixed mechanically in powder form, a composition in which antibacterial agent deposit on a surface qf polyamide powder, a composition in which antibacterial agent is coated on a surface of polyamide powder, a composition in which antibacterial agent is kneaded in polyamide.

The proportion of the antibacterial agent in the composition is not specially limited but is decided so as to balance efficiency and price. Usually, the proportion of the antibacterial agent in the composition is higher than 0.01% but lower than 10%, preferably higher than 0.05% but lower than 5%, more preferably higher than 0.1% but lower than 3%.

The composition containing antibacterial agent according to the present invention can be prepared by any known technique. For example, antibacterial agent and polyamide powder are mixed mechanically to prepare the composition. Or, polyamide powder and antibacterial agent are mixed firstly and then antibacterial agent is coated or deposited on a surface of the polyamide particle by means of collision energy or shear energy for example to prepare the composition. Or, antibacterial agent is kneaded in polyamide and then the kneaded product is pulverized into a fine particles of composition. These techniques are only for illustration the present invention is not limited to these methods.

Powder coating method of polyamide powder composition containing the antibacterial agent is not limited specially but can be any known method including fluidized bed method, electrostatic coating and melt-spraying.

Function

The composition according to the present invention gives anti-microbial property to powder paint and gives good surface characteristic with little or no discoloration during heating stage in a coating process.

Such advantage of the present invention is desired and effective in such applications as grab handles of public vehicles, shopping carts, dish washer, kitchenware and wall materials used in humid rooms.

EXAMPLE

The present invention will be explained in much in details by following Examples but the present invention should not be limited to the examples.

In Example and Comparative Example, the qualities of coating and coated film were determined by following methods.

(1) Coating

Epoxy type primer was sprayed on a surface of a de-rust and degreased iron plate having a thickness of 3.2 mm and then coating was effected in such a manner that a dried film had a thickness of 10 micron. The resulting coated iron plate was heated in an oven at 400° C. for 3 minutes 40 seconds and then was taken out when the surface temperature of the iron plate became 280° C. The resulting heated plate was immersed in a fluidized bed filled with a powder paint containing antibacterial agent to obtain a test sample having a coated film having a thickness of 400 microns.

(2) Anti-microbial Property of the Coated Film

Test bacterium (*Bacillus coli* and yellow grapes *Staphylococcus aureus*) as cultivated in NA culture medium with 37° C. for 24 hours. 0.15 ml of the bacterium liquid prepared was dropped onto a surface of the test sample film (above-mentioned, 3 cm×3 cm) and a polyethylene film was put on the surface. Assembly was left at 35° C. under a relative humidity of 90%. Test was repeated for three times for one sample. The same procedure as above was repeated on polyethylene film as control.

After the sample was left for 24 hours, the plate was washed with 2 ml of physiological salt solution to collect survived bacterium. This liquid was cultured by Agar Plate Culture technique (cultured at 35° C. for 2 days) to determine a number of survived bacterium.

(3) Adhesion of Coated Film to Iron Plate

Test according to JIS K5400, 8.5.2 (Japanese Industrial Standard). Unit area had an interval of 2 mm. The results were expressed by a number of unit areas left (not-peeled off). 25/25 means that "there was no unit area peeled off".

(4) Hue, Whiteness and Gloss of Coated Film

Hue: determined according to JIS K5400, 7.4.2.
Whiteness: WI was determined according to ASTM E313.
Gloss: determined according to JIS K5400, 8.5.2 at angle of incidence of 60°.

(5) Durability of Coated Film

Durability: determined after coated iron plate was hung in water 23° C. for predetermined time duration
Accelerated weather-resistance: determined according to JIS K5400, 7.6.

Example 1, 2, Comparative Example 1, 2

Following antibacterial agents were mixed to a powder paint (RILSAN® fine powder product of Elf Atochem) W1482 consisting mainly of polyamide 11 in Henschel mixer to prepare respective powder paint compositions:
1) Silver-substituted inorganic ion exchanger (antibacterial agent A),
2) Zinc type inorganic glass (antibacterial agent B) and
3) the zinc type inorganic glass was combined with the silver-substituted inorganic ion exchanger (antibacterial agent C)

The resulting powder paint composition was coated on iron plate in a fluidized bed.

The whiteness of a film containing no antibacterial agent (composition 1) was 76.8 (Comparative Example 1), and the whiteness of a film containing 0.2% of the antibacterial agent A (composition 2) was 54.5 (Comparative Example 2). This shows that the antibacterial agent A caused sever discoloration.

On the contrary, the whiteness of a film containing 0.2% of the antibacterial agent B (composition 3) was 76.0 (Example 1), and the whiteness of a film containing 0.2% of the antibacterial agent C (composition 3) was 75.9 (Example 2). In other words, these compositions 3 and 4 showed no substantial difference in whiteness from the composition 1 containing no antibacterial agent.

Coated films obtained from the compositions 1 and 4 showed the same adhesion of 25/25. This means that the antibacterial agent C did not deteriorate adhesion.

The number of survived bacterium count in the composition 1 (containing no antibacterial agent) was 10E6 for *Bacillus coli* and 10E5 for yellow grapes *Staphylococcus aureus*, while respective numbers of survived bacterium count in the composition 2 (containing silver type antibacterial agent), composition 3 (containing zinc type antibacterial agent) and composition 4 (containing silver/zinc composite antibacterial agent) were all under 10.

Example 3, Comparative Example 3

Into a powder paint (RILSAN® fine powder product of Elf Atochem) Gray 3362 consisting mainly of polyamide 11, 0.3% of the composite antibacterial agent consisting of zinc type inorganic glass and silver-substituted inorganic ion exchanger (antibacterial agent C) was mixed in Henschel mixer to prepare a powder paint composition (composition 5).

For comparison, a blank composition containing no antibacterial agent (Comparative Example 3) was also prepared.

The powder paint composition was coated on iron plate in a fluidized bed and the resulting film was subjected the accelerated weather-resistance test effected under Sunshine Weather-meter for 1,000 hours. Both compositions showed the same color-difference ($\Delta E$) of 0.8.

The gloss of film obtained from the composition 6 was 67.4, while the gloss of Comparative Example 3 was 64.0. This reveals such a fact that addition of the antibacterial agent give little influence to gloss.

Example 4, Comparative Example 4, 5

Into a powder paint (RILSAN® fine powder product of Elf Atochem) W1482 consisting mainly of polyamide 11, 0.5% of the composite antibacterial agent consisting of zinc type inorganic glass and silver-substituted inorganic ion exchanger (antibacterial agent C) was mixed in Henschel mixer to prepare a powder paint composition (composition 6) and the powder paint composition was coated on iron plate in a fluidized bed. The whiteness of the film (Example 4) was 76.5 which was not so different from the value of 76.8 obtained in Comparative Example 1.

For comparison, a composition containing 0.5% of the antibacterial agent A (silver-type) (Comparative Example 4) was also prepared. The whiteness of this film was 41.2. This means that the discoloration was worse than Comparative Example 2.

Coated film of the composition 6 together with a coated film containing no antibacterial agent (Composition 1) was immersed in water 23° C. for 1,000 hours. Difference * in the number of survived bacterium (increase and decrease) after the treatment was 5 for *Bacillus coli* and 2 for yellow grapes *Staphylococcus aureus*. This reveals that the film according to the present invention possesses high antibacterial.

[* Difference in the number of survived bacterium was expressed by a logarithm of an inverse number of a ratio of a number of bacterium in a film containing the antibacterial agent to a number of bacterium in a film containing no antibacterial agent. Therefore, higher value shows higher efficiency].

Advantages of the Invention

As explained, the composition according to this invention gives antibacterial film which is hardly discolored during heating stage and has enough endurance.

What is claimed is:

1. An article comprising:
an object, and
a coating on the object, wherein the coating comprises an antibacterial powder paint composition, comprising:
a polyamide, and
an antibacterial agent of zinc and/or a silver/zinc composite.

2. An article according to claim 1, wherein the polyamide is polyamide-11 or polyamide-12.

3. An article according to claim 1, wherein the polyamide is a powder and mechanically mixed with the antibacterial agent.

4. An antibacterial powder paint composition, comprising:
a polyamide, and
an antibacterial agent of zinc and/or a silver/zinc composite, wherein the agent is deposited on a surface of the polyamide that is a powder.

5. An antibacterial powder paint composition, comprising:
a polyamide, and
an antibacterial agent of zinc and/or a silver/zinc composite, wherein the agent is coated on a surface of the polyamide that is a powder.

6. An article according to claim 1, wherein the antibacterial agent is kneaded with the polyamide that is a powder.

7. An article according to claim 1, further comprising a support for the zinc and/or silver/zinc composite.

8. An article according to claim 7, wherein the support is a zeolite, an inorganic ion exchanger, or an inorganic glass compound.

9. An article according to claim 7, wherein the support is an inorganic ion exchanger or an inorganic glass compound.

10. A public vehicle handle, a shopping cart, a dishwasher, a kitchenware or a wall material painted with an antibacterial powder paint composition, comprising:
a polyamide, and
an antibacterial agent of zinc and/or silver/zinc composite.

11. A public vehicle handle, a shopping cart, a dishwasher, a kitchenware or a wall material painted with a composition according to claim 5.

12. An article according to claim 1, wherein the polyamide is a powder.

13. An article according to claim 1, further comprising at least one additive of a pigment, a dye, a heat-stabilizer, a light-stabilizer, a lubricant, a plasticizer, an antistatic agent, a crystal nucleus forming agent, or a fire retardant.

* * * * *